Patented Feb. 25, 1936

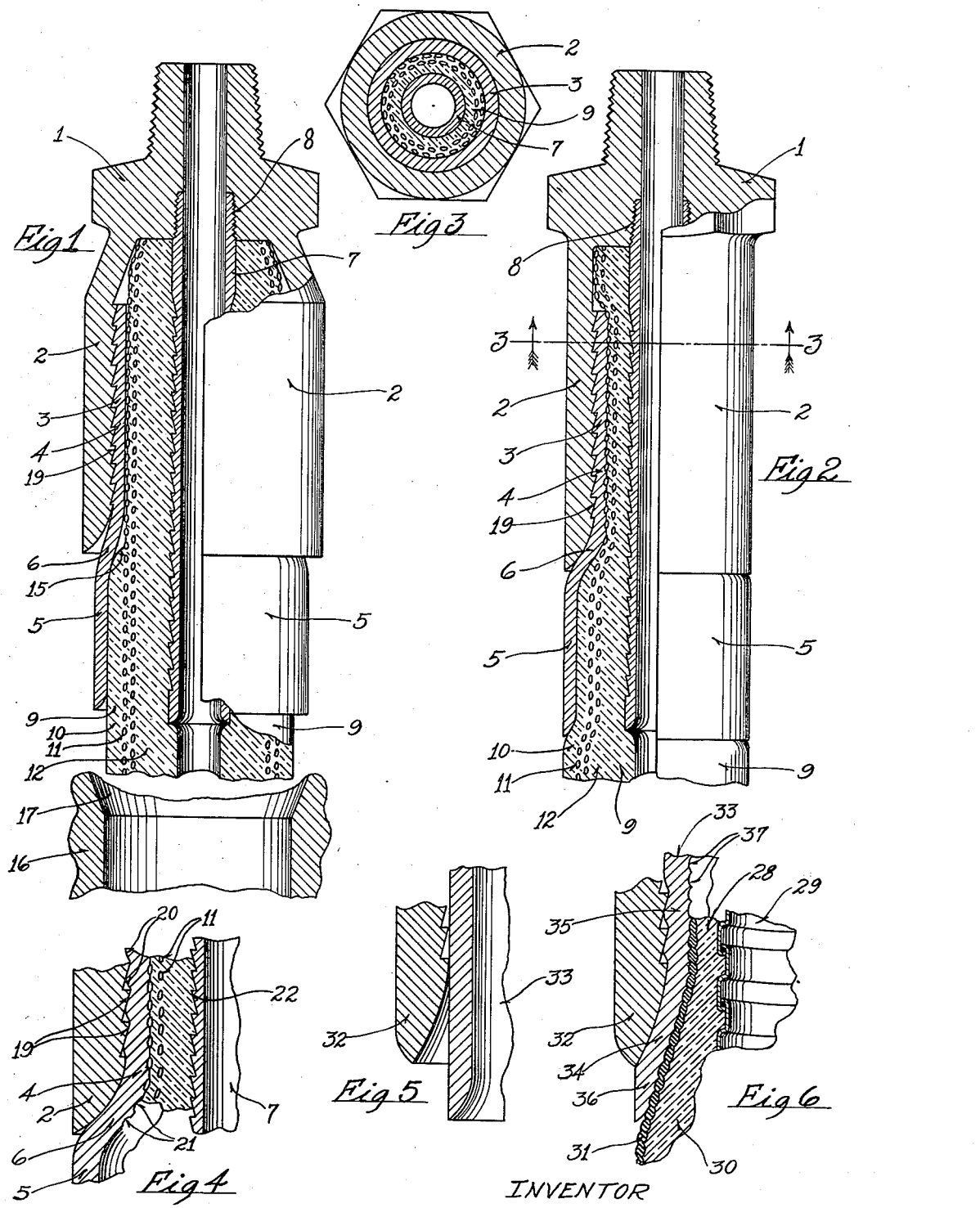

2,031,833

UNITED STATES PATENT OFFICE 2,031,833

PRESSED-ON HOSE COUPLING

George Hutchinson, Manitowoc, Wis., assignor to Eastman Manufacturing Company, Manitowoc, Wis.

Application December 4, 1934, Serial No. 755,901

7 Claims. (Cl. 285—84)

The invention provides a hose coupling of the class known as pressed-on couplings, in which class a sleeve is permanently contracted on to the end of a hose to grip the same.

And, in that class, the invention belongs to the type in which an inner sleeve, of soft metal, is interposed between the main or outer sleeve and the hose, to help in gripping the hose.

The distinguishing feature of the present invention is that such inner sleeve is then extended to form a skirt, less tightly contracted upon the hose, to protect the hose where it emerges from the tightly gripping portion of the coupling.

Such protection, by means of a skirt formed as a continuation of the inner sleeve, is found to be more effective than it is when the skirt is formed as a continuation of the outer sleeve. Its chief superiority lies in the fact that a continuous integral tubular covering is thereby provided for the hose, with smoothly rounded or graduated changes from one diameter to another, which prevent too sharp a bend in the hose at its point of emergence, and which prevent the cutting of its outer covering, whether of rubber or of cotton. Such smooth changes are not easy to attain in couplings in which the inner sleeve is ended earlier, and in which therefore the duties of the skirt are performed by an extension of the outer sleeve.

In the drawing:

Figs. 1 and 2 are elevations, partly in section, of the preferred form of the coupling, respectively before, and after, contraction on to the hose.

Fig. 3 is a cross-sectional view on line 3—3, Fig. 2.

Fig. 4 is a sectional detail of the preferred form, after contraction, showing the soft inner sleeve embedded into the unevennesses of the wire reinforcements of the hose.

Figs. 5 and 6 show a modification adapted for use upon a metal-cored hose, the two figures being respectively before, and after, contraction. Both are broken away, sectional views, the hose being removed in the first of them.

In this description and in the claims, the end at which the joining to other equipment is effected is called the upper end of the coupling; and in the drawing, accordingly, the coupling is drawn with its coupling end upward. This is done for the sake of clearness in description, and it is to be understood that, in use, the coupling may point in any direction.

Referring to the drawing:

Describing first the preferred form, and referring more particularly to Fig. 1:

The body 1 has the outer sleeve 2 integral therewith and extending downwardly therefrom.

The inner sleeve 3 comprises the upper portion 4, inserted into said outer sleeve 2, and the lower portion or skirt 5, extending below said outer sleeve, said skirt portion being of larger diameter than said upper portion, and being joined thereto by the flared portion 6. The insert 7 is threaded tightly into said body 1 by the threads 8, and acts as an internal reinforcement for the hose when the latter is compressed.

The hose 9 comprises the outer covering 10, of compressible material, the braided wire reinforcements 11, here shown diagrammatically, and the inner portion 12, also of compressible material.

Said outer covering 10 ends, however, at the shoulder 15, the upper portion of such covering, which originally existed, having been stripped off, permitting said wire reinforcements 11 to come into direct contact with the inside of said upper portion 4 of the inner sleeve, when the hose end is inserted into the inner sleeve as shown in Fig. 1.

Contraction of the coupling is effected by forcing it, lower end foremost, into the cylindrical die 16 with tapered mouth 17, the die being shown in Fig. 1 only.

Referring now more particularly to Figs. 2 and 4 which show the coupling after contraction, it is seen that the process of contraction has caused changes as follows:

The flared portion 18 of said outer sleeve 2, existing in Fig. 1, has disappeared in Fig. 2, as the result of the contraction, and the outside diameter of said outer sleeve is now substantially the same as the outside diameter of the free portion of the hose.

Also said outer sleeve, during its contraction, has bedded its ratchet teeth 19 into the substance of said upper portion 4 of said inner sleeve, as is shown most clearly in Fig. 4, where the curves 20 of the outside of the inner sleeve are shown as bulging into the notches between said teeth 19.

Also during said contraction of said outer sleeve, said upper portion 4 of said inner sleeve has been correspondingly reduced in diameter.

Also the soft metal of said upper portion 4 of the inner sleeve has embedded itself into the unevennesses of said wire braiding 11, of the hose, as is shown most clearly in Fig. 4, where the indentations 21 are shown as having been formed by the pressure of said braiding, said indentations being shown diagrammatically.

Also said inner portion 12 of the hose has been greatly compressed, thereby having become a firm resistant core, firm enough to enable the bulges and indentations in said soft metal inner sleeve to be formed as just described.

The changes just described, resulting from the contraction, cause the outer sleeve to grip the inner sleeve, and cause the inner sleeve, in turn, to directly grip the wire braiding of the hose. The barbs 22 provided upon said insert 7 also help in gripping the hose. Thus the coupling is protected from tending to be blown off under high internal pressures.

Further results of the contraction concern said skirt portion 5 of the inner sleeve and said flared portion 6 of the same.

Said skirt 5 has been contracted until its outside diameter is equal to that of the contracted diameter of said outer sleeve 2, as is shown in Fig. 2. Said skirt, accordingly, covers, and slightly compresses, a portion of the length of the hose from which portion said outer covering 10 has not been stripped.

Said flared portion 6 has meantime been caused to form itself afresh, to accommodate a greater decrease in diameter occurring in said upper portion 4 of said inner sleeve than in said skirt portion 5.

And, in thus reforming itself, said flared portion 6 has been caused to accommodate itself to, and to fit tightly over, said shoulder 15, Fig. 1, of said outer covering 10, thus protecting the upper edge of said outer covering more effectually than could have been done if, instead of the present construction a skirt had been provided as an extension, not of the inner, but of the outer, sleeve.

Said inner sleeve 3 is preferably treated, by heat or otherwise, in such way that its said upper portion 4 is softer than its said skirt portion 5, whereby the former portion receives indentations more readily, while the latter portion is more resistant to wear.

Turning to the modification, Figs. 5 and 6, which are views before and after contraction respectively:

The invention is there shown as adapted for use upon a metal-cored hose. The hose 28, Fig. 6, comprises the internal metal reinforcement 29, surrounded by the intermediate material 30, surrounded by the woven cotton jacket 31.

In said Figs. 5 and 6, the outer sleeve 32 corresponds with the outer sleeve 2 of the preferred form, and the inner sleeve 33 corresponds with the inner sleeve 3 of the preferred form.

Said cotton jacket 31 must not be stripped off, for which reason there is an absence of any step in the outside diameter of the hose, which would require a corresponding step in the coupling, such as exists in the preferred form. Therefore said inner sleeve 33 is made of uniform diameter before contraction, Fig. 5. As a result of the contraction, the flare 34 is formed in it, Fig. 6, joining the heavily compressed upper portion 35 and the lightly compressed skirt portion 36. Dents 37 in said upper portion 35, formed by the unevennesses of said cotton jacket 31, correspond with the dents 21 of the preferred form, Fig. 4.

It is to be noted that, in this modification, said skirt 36 is formed as a cone rather than as a cylinder, thus making more gradual the change from greater to less pressure upon the hose.

In this modification, as in the preferred form, the skirt, formed as a continuation of the inner sleeve, gives the hose less sudden changes, in support, and in protection of its covering, in the vicinity of its emergence from the tightly compressed portion of the coupling, than would be obtained if a skirt were formed as a continuation of the outer sleeve.

I claim:

1. A hose coupling comprising an outer sleeve and an inner sleeve, both said sleeves being of continuous material adapted to encircle the hose, said inner sleeve comprising an upper portion and a lower or skirt portion, both of substantial length, said outer sleeve being adapted to be permanently contracted on to said upper portion of said inner sleeve, thereby causing said portion to be also permanently contracted, to grip the end of a hose placed therein, said skirt portion then extending downward, beyond said outer sleeve, around the hose.

2. A hose coupling as claimed in claim 1, said two portions being, after contraction, substantially each a tube, the skirt being of substantially greater internal diameter than the upper portion, and a shoulder portion joining said two portions and being integral with both.

3. In combination, a hose end, and a hose coupling adapted to be permanently pressed on to the same to grip it, said hose end being stripped of its outer covering for a substantial distance, and said coupling comprising an outer sleeve and an inner sleeve, both being tubular and both encircling the hose, said inner sleeve comprising an upper portion integral with a lower or skirt portion, both of substantial length, said upper portion being placed within said outer sleeve and said skirt portion extending below the same, the lower edge of said upper portion registering approximately with the lower edge of said stripped portion of the hose.

4. A hose coupling comprising an inner sleeve and an outer sleeve, said inner sleeve comprising a continuous tube shouldered at a point intermediate of its length, to form an upper portion and a lower or skirt portion of greater internal diameter, whereby said sleeve is adapted to receive a hose-end shouldered to two different diameters, said outer sleeve being adapted to be permanently contracted, and said upper portion of said inner sleeve being adapted to be placed within said outer sleeve, whereby said outer sleeve, when it is contracted, will contract said upper portion to grip the hose, said skirt portion being not covered by said outer sleeve, and being therefore adapted to be contracted to any desired extent, to press upon the hose with any desired intensity, independently of the extent of the contraction of said upper part.

5. A hose coupling as claimed in claim 1, said coupling further comprising an end wall, and said outer sleeve being integral with said wall, extending downwardly from the same.

6. A hose coupling as claimed in claim 1, said skirt portion being then of substantially the same outside diameter as said outer sleeve.

7. A hose coupling comprising a continuous tubular sleeve of substantially uniform wall thickness before contraction, adapted to encircle the end of a hose and to be permanently contracted to grip the same, said sleeve comprising after such contraction an upper portion and a lower or skirt portion, each of substantial length and each of substantially uniform bore throughout their lengths, the bore of said upper portion being substantially less than that of said skirt portion, said two portions being joined by a shoulder portion.

GEORGE HUTCHINSON.